(12) United States Patent
Witz et al.

(10) Patent No.: US 8,713,797 B2
(45) Date of Patent: May 6, 2014

(54) HOSE

(71) Applicant: BHP Billiton Petroleum Pty Ltd, Melbourne (AU)

(72) Inventors: Joel Aron Witz, Newdigate (GB); David Cox, Hertford (GB); Gerard Anthony Hall, Little Sutton (GB); Richard Smith, London (GB)

(73) Assignee: BHP Billiton Petroleum Pty Ltd., Melbourne (AU)

( * ) Notice: Subject to any disclaimer, the term of this patent is extended or adjusted under 35 U.S.C. 154(b) by 0 days.

(21) Appl. No.: 13/656,840

(22) Filed: Oct. 22, 2012

(65) Prior Publication Data
US 2013/0047436 A1 Feb. 28, 2013

Related U.S. Application Data

(62) Division of application No. 12/300,117, filed as application No. PCT/GB2007/001691 on May 8, 2007, now abandoned.

(30) Foreign Application Priority Data

May 8, 2006 (EP) .................................. 06252420
May 8, 2006 (GB) .................................. 0609083.1

(51) Int. Cl.
*B21D 51/16* (2006.01)

(52) U.S. Cl.
USPC ..................... 29/890.144; 29/423; 138/109

(58) Field of Classification Search
USPC ............................ 29/890.144, 423
See application file for complete search history.

(56) References Cited

U.S. PATENT DOCUMENTS 956,076 A 4/1910 Greenfield
1,178,559 A 4/1916 Vautier
(Continued)

FOREIGN PATENT DOCUMENTS

CN 1441884 9/2003
CN 1732352 2/2006
(Continued)

OTHER PUBLICATIONS

Patent Application entitled, "Improvements Relating to Pipe", by Joel Aron Witz filed on Mar. 12, 2010 as U.S. Appl. No. 12/677,852.
(Continued)

*Primary Examiner* — David Bryant
*Assistant Examiner* — Ruth G Hidalgo-Hernandez
(74) *Attorney, Agent, or Firm* — Brinks Gilson & Lione; G. Peter Nichols

(57) ABSTRACT

The invention relates to a composite hose, which is capable of being used without leakage, and which has a longer length and/or diameter than has been previously achievable. A composite hose comprises a tubular body of flexible material arranged between an inner and an outer helically wound wire. The hose further comprises an axial strengthening means adapted to reduce deformation of the tubular body when the tubular body is subjected to axial tension, the axial strengthening means being adapted to exert a radially inward force on at least part of the tubular body when axial strengthening means is subjected to axial tension. The hose can have length above 30 m and a diameter above 400 mm. A method of, and apparatus for, making the hose are also described, which involves the use of a non-metallic mandrel.

9 Claims, 4 Drawing Sheets

(56) References Cited

U.S. PATENT DOCUMENTS

| | | | |
|---|---|---|---|
| 1,588,606 | A | 6/1926 | Oden |
| 1,599,775 | A | 9/1926 | Lamb et al. |
| 1,607,909 | A | 11/1926 | Oden |
| 1,785,345 | A | 12/1930 | Hasemann |
| 1,810,032 | A | 6/1931 | Schulthess |
| 1,911,486 | A | 5/1933 | Bacheldor et al. |
| 2,011,781 | A | 8/1935 | Tabozzi |
| 2,184,984 | A | 12/1939 | Van Stone et al. |
| 2,371,363 | A | 3/1945 | Smith |
| 2,610,869 | A | 9/1952 | Percy |
| 2,661,026 | A | 12/1953 | Schulthess |
| 2,706,494 | A | 4/1955 | Morse |
| 2,825,364 | A | 3/1958 | Cullen et al. |
| 2,829,671 | A | 4/1958 | Ernst et al. |
| 2,858,147 | A | 10/1958 | Guarnaschelli |
| 2,940,778 | A | 6/1960 | Kaiser |
| 3,004,779 | A | 10/1961 | Cullen et al. |
| 3,140,106 | A | 7/1964 | Thomas et al. |
| 3,189,370 | A | 6/1965 | Marshail |
| 3,240,234 | A | 3/1966 | Bond, Jr. et al. |
| 3,240,643 | A * | 3/1966 | Clark et al. ............ 156/143 |
| 3,287,194 | A * | 11/1966 | Waddell, Jr. ........... 156/144 |
| 3,318,620 | A | 5/1967 | Cullen et al. |
| 3,333,325 | A | 8/1967 | Stanley |
| 3,462,177 | A | 8/1969 | Skinner et al. |
| 3,538,728 | A | 11/1970 | Tribey |
| 3,603,719 | A | 9/1971 | Lejeune |
| RE28,155 | E | 9/1974 | Dow et al. |
| 3,856,052 | A | 12/1974 | Feucht |
| 3,919,026 | A | 11/1975 | Mizutani et al. |
| 4,033,612 | A | 7/1977 | Chevalier |
| 4,063,757 | A | 12/1977 | Fuhrmann |
| 4,303,105 | A | 12/1981 | Rohner |
| 4,323,089 | A | 4/1982 | Kadono et al. |
| 4,330,143 | A | 5/1982 | Reneau |
| 4,344,908 | A | 8/1982 | Smith et al. |
| 4,351,366 | A | 9/1982 | Angioletti |
| 4,377,186 | A | 3/1983 | Genini et al. |
| 4,411,845 | A | 10/1983 | Tanahashi |
| 4,422,993 | A | 12/1983 | Smith et al. |
| 4,430,383 | A | 2/1984 | Smith et al. |
| 4,436,689 | A | 3/1984 | Smith et al. |
| 4,445,543 | A | 5/1984 | Mead |
| 4,570,678 | A | 2/1986 | Ziemek et al. |
| 4,634,153 | A | 1/1987 | Kishton |
| 4,826,354 | A | 5/1989 | Adorian |
| 4,924,679 | A | 5/1990 | Brigham |
| 4,950,001 | A | 8/1990 | Briggs |
| 4,984,605 | A | 1/1991 | Schippl |
| 5,182,147 | A | 1/1993 | Davis |
| 1,901,330 | A | 3/1993 | Poberejsky |
| 5,192,384 | A * | 3/1993 | Barrier et al. .......... 156/189 |
| 5,480,193 | A | 1/1996 | Echols et al. |
| 5,485,870 | A | 1/1996 | Kraik |
| 5,600,752 | A | 2/1997 | Lopatinsky |
| 5,639,128 | A | 6/1997 | Belcher |
| 5,647,563 | A | 7/1997 | Gantner et al. |
| 5,685,576 | A | 11/1997 | Wolfe et al. |
| 5,698,278 | A | 12/1997 | Emond et al. |
| 5,860,682 | A | 1/1999 | Belcher |
| 5,893,681 | A | 4/1999 | Boden |
| 6,110,550 | A | 8/2000 | Jarrin et al. |
| 6,334,466 | B1 | 1/2002 | Jani et al. |
| 6,659,510 | B1 | 12/2003 | Ikegami et al. |
| 6,732,765 | B2 | 5/2004 | Schippl et al. |
| 6,874,542 | B2 | 4/2005 | Mayau et al. |
| 6,883,549 | B2 | 4/2005 | Schippl |
| 6,923,477 | B2 | 8/2005 | Buon et al. |
| 7,243,686 | B2 | 7/2007 | Burke et al. |
| 7,681,599 | B2 | 3/2010 | Lange et al. |
| 7,712,792 | B2 | 5/2010 | Burke et al. |
| 7,735,524 | B2 | 6/2010 | Burke et al. |
| 7,743,792 | B2 | 6/2010 | Burke et al. |
| 2003/0178085 | A1 * | 9/2003 | Burke et al. ........... 138/138 |
| 2003/0217779 | A1 | 11/2003 | Schippl |
| 2004/0066035 | A1 | 4/2004 | Buon et al. |
| 2004/0112454 | A1 | 6/2004 | Takagi |
| 2004/0146676 | A1 | 7/2004 | Ikemoto |
| 2004/0256016 | A1 * | 12/2004 | Arima et al. ........... 138/126 |
| 2005/0173227 | A1 * | 8/2005 | Adamski et al. ....... 198/579 |
| 2007/0024051 | A1 | 2/2007 | Witz et al. |
| 2009/0320951 | A1 | 12/2009 | Witz et al. |
| 2010/0059133 | A1 | 3/2010 | Witz et al. |
| 2010/0180976 | A1 | 7/2010 | Witz et al. |
| 2010/0183371 | A1 | 7/2010 | Witz et al. |
| 2010/0224277 | A1 | 9/2010 | Witz et al. |
| 2010/0229991 | A1 | 9/2010 | Witz et al. |
| 2010/0229992 | A1 | 9/2010 | Witz et al. |

FOREIGN PATENT DOCUMENTS

| | | |
|---|---|---|
| DE | 1 425 453 | 7/1969 |
| DE | 2 431 277 | 1/1975 |
| DE | 2 948 416 | 6/1981 |
| DE | 3 440 459 | 5/1986 |
| DE | 9 207 276 | 10/1992 |
| DE | 9 407 409 | 7/1994 |
| DE | 10 2005 046367 | 4/2006 |
| EP | 0 032 352 | 7/1981 |
| EP | 0 076 540 | 4/1983 |
| EP | 0 183 285 | 4/1986 |
| EP | 0 241 656 | 10/1987 |
| EP | 0 215 507 | 11/1989 |
| EP | 0 438 831 | 8/1995 |
| EP | 0 264 587 | 4/1998 |
| EP | 0 855 496 | 7/1998 |
| EP | 0 895 013 | 5/2000 |
| EP | 0 833 769 | 10/2001 |
| EP | 1 288 558 | 3/2003 |
| EP | 1 344 969 | 9/2003 |
| EP | 1 428 748 | 6/2004 |
| FR | 1499956 | 4/1966 |
| FR | 2194906 | 3/1974 |
| FR | 2235324 | 6/1974 |
| FR | 2753257 | 3/1998 |
| GB | 323352 | 1/1930 |
| GB | 550543 | 1/1943 |
| GB | 591307 | 8/1947 |
| GB | 591560 | 8/1947 |
| GB | 741643 | 12/1955 |
| GB | 849121 | 9/1960 |
| GB | 850131 | 9/1960 |
| GB | 895553 | 5/1962 |
| GB | 1019370 | 2/1966 |
| GB | 1034956 | 7/1966 |
| GB | 1312509 | 4/1973 |
| GB | 1383313 | 2/1974 |
| GB | 1477433 | 6/1977 |
| GB | 2070725 | 9/1981 |
| GB | 2104992 | 3/1983 |
| GB | 2104996 | 3/1983 |
| GB | 2107819 | 5/1983 |
| GB | 2186657 | 8/1987 |
| GB | 2223817 | 4/1990 |
| GB | 2289107 | 11/1995 |
| GB | 2303574 | 2/1997 |
| GB | 2312725 | 11/1997 |
| GB | 2339251 | 1/2000 |
| GB | 2363440 | 12/2001 |
| GB | 2366345 | 3/2002 |
| GB | 2408307 | 5/2005 |
| JP | 1283494 | 11/1989 |
| JP | 08011138 | 1/1996 |
| JP | 08336845 | 12/1996 |
| JP | 11325333 | 11/1999 |
| JP | 03075132 | 3/2001 |
| SU | 396271 | 8/1973 |
| WO | WO 93/24731 | 12/1993 |
| WO | WO 96/36592 | 11/1996 |
| WO | WO 97/00805 | 1/1997 |
| WO | WO 01/96772 | 12/2001 |
| WO | WO 2004/044472 | 5/2004 |
| WO | WO 2004/079248 | 9/2004 |
| WO | WO 2005/119150 | 12/2005 |

(56) References Cited

FOREIGN PATENT DOCUMENTS

| WO | WO 2006/044053 | 4/2006 |
| WO | WO 2007/129092 | 11/2007 |
| WO | WO 2009/034340 | 3/2009 |
| WO | WO 2009/034357 | 3/2009 |
| WO | WO 2009/034364 | 3/2009 |

OTHER PUBLICATIONS

Patent Application entitled, "Improvements Relating to Hose End Fittings", by Joel Aron Witz filed on Jun. 15, 2010 as U.S. Appl. No. 12/667,853.
Patent Application entitled, "Hose", by Joel Aron Witz filed on Jun. 10, 2010 as U.S. Appl. No. 12/667,854.
International Search Report and Written Opinion for PCT Application Serial No. PCT/GB2008/003098, dated Dec. 12, 2008, 6 pages.
International Preliminary Report on Patentability for PCT Application Serial No. PCT/GB2008/003098, dated Mar. 16, 2010, 5 pages.
International Search Report and Written Opinion for PCT Application Serial PCT/GB2008/003135, dated Dec. 12, 2008, 7 pages.
International Preliminary Report on Patentability for PCT Application Serial No. PCT/GB2008/003135, dated Mar. 16, 2010, 6 pages.
International Search Report and Written Opinion for PCT Application Serial No. PCT/GB2008/003121, dated Dec. 15, 2008, 10 pages.
International Prelimiary Report on Patentability for PCT Application Serial No. PCT/GB2008/003121, dated Mar. 16, 2010, 7 pages.
International Search Report for PCT Application Serial No. PCT/GB01/02562.
International Preliminary Examination Report for PCT Application Serial No. PCT/GB01/02562, published on Dec. 20, 2001.
International Preliminary Report on Patentability for PCT Application Serial No. PCT/GB07/002446, dated Jan. 15, 2009.
International Preliminary Report on Patentability and Written Opinion for PCT Application Serial No. PCT/GB2007/003063, dated Feb. 26, 2009.
International Preliminary Report on Patentability and Written Opinion for PCT Application Serial No. PCT/GB2007/003058, dated Feb. 26, 2009.
Translation of Office Action for Chinese Patent Application Serial No. 2007800216292, dated Mar. 10, 2010, 9 pages.
Translation of Office Action for Chinese Patent Application Serial No. 2007800378028, dated Mar. 8, 2010, 8 pages.
Translation of Office Action for Chinese Patent Application Serial No. 2007800378136, dated Mar. 10, 2010, 6 pages.
Translation of Decision of Rejection for Chinese Patent Application Serial No. 2007800378136 dated Nov. 12, 2010, 8 pages.

\* cited by examiner

HOSE

This application is a divisional of U.S. application Ser. No. 12/300,117 and claims priority to International Application No. PCT/GB/2007/001691 filed on May 8, 2007 and to European Application No. 06252420.2 filed May 8, 2006 and also to European Application No. 0609083.1 filed May 8, 2006, the entire contents of each are incorporated herein by reference.

BACKGROUND

This invention relates to hose, and more particularly relates to long length hose, and to a method and apparatus for making it. The invention is especially concerned with hose which can be used in cryogenic conditions.

Typical applications for hose involve the pumping of fluids from a fluid reservoir under pressure. Examples include supplying of domestic heating oil or LPG to a boiler; transporting produced oilfield liquids and/or gases from a fixed or floating production platform to the cargo hold of a ship, or from a ship cargo hold to a land-based storage unit; delivering of fuel to racing cars, especially during refueling in formula 1; and conveying corrosive fluids, such as sulphuric acid.

It is well known to use hose for the transport of fluids, such as liquefied gases, at low temperature. Such hose is commonly used to transport liquefied gases such as liquefied natural gas (LNG) and liquefied propane gas (LPG).

Many applications of hose require the hose to be supported along its length. This especially applies to the transport of the produced liquids and/or gases mentioned above. Without additional support, conventional hose is often incapable of supporting its own weight, or the weight of the fluid contained therein.

Three main types of hose exist that are used for large bore applications for transferring fluids at elevated pressure (e.g. at least 2 barg). These are:

1. Rubber (rubber wraps vulcanised to form the hose body).
2. Bellows (convoluted steel tube).
3. Composite (films and fabrics between two helical wires).

The present invention is directed to composite hoses.

Rubber hoses differ from composite and bellows hose in that they do not have a steel component on the inner surface.

Rubber hoses are typically manufactured by wrapping numerous layers of rubber materials and some steel and fabric layers around a mandrel coated with a release agent. Some Rubber Hoses use an extruded rubber inner liner on a mandrel as the innermost layer and then wrap after that. Other rubber hoses include an interlocked carcass inside the liner, for collapse resistance. The complete structure is then vulcanised thus bonding the rubber wraps together. The complete hose assembly, including the end fittings which are also on the mandrel and are wrapped into the hose body structure, is removed from the mandrel by pulling and rotating. The hose and mandrel are supported by a series of rollers during this extraction process. Rubber hoses are typically made in lengths of up to 12 m and bores of up to at least 1.2 m.

In essence, the traditional method of manufacture for the bellows and composite hose is the same as that of a rubber hose. A bellows hose is formed in sections supported on steel mandrel and if insulating or protective layers are required these will be wrapped around the bellows tube. A composite hose is traditionally formed by a steel wire being wound helically onto a steel mandrel followed by a number of film and fabric layers. This is then formed into the hose body by the application of a second helical wire.

Both bellows and composite hoses are widely available in bores of up to 200 mm and in lengths of up to about 30 m. However it is difficult to manufacture and extract a large bore hose, greater than 400 mm, of either of these types in a reasonable length, greater than 10 m, using the traditional manufacturing techniques. This is not the case with rubber hoses as they do not have an inner steel component.

Both bellows and composite hoses are currently manufactured on steel mandrels, which for small diameters works well and is the industry standard; but as the diameter increases the effect of friction is increased dramatically. The surface area of contact between the hose and the mandrel increases linearly with diameter but the weight of the mandrel increases approximately with the square of the diameter. The product of these two factors is the friction between the hose and mandrel as during extraction the weight of the mandrel is taken through the hose.

Other factors affecting the ease of extraction include:
Galling between the steel mandrel and the steel wire.
The coefficient of friction between the two materials.
The weight of the hose.
The use of supporting rollers used to control mandrel deflection.

Attempts to manufacture hoses using the traditional techniques have resulted in hoses that have the required bore but are too short, or have the required bore and length but have been damaged during extraction. It has also been the case that the mandrel has become damaged during extraction and so in an industrial setting this process would be impractical and uneconomic.

Composite hose is described in many prior art documents, including, for example, EP-0076540A1 and WO01/96772. As discussed above, this type of hose is characterised by an inner metallic inner structure which is difficult to remove from the mandrel during the manufacturing process. As a result there is a practical limit on the size of hose which can be produced in the prior art, while at the same time retaining the ability to operate in hostile environments, such as in conditions of low and high temperature; and in marine applications.

GB2303574, DE2948416, JP08336845, JP08011138 and JP03075132 disclose a method of making hose or tubing, but they do not disclose the manufacture of bellows hose.

Bellows hose is exclusively manufactured on a metallic mandrel; the mandrel may consist exclusively of the stainless steel or may be clad with stainless steel. In 2005, a carbon steel mandrel might typically cost about. £25,000 and in its working lifetime it would be capable of being used to manufacture about 25-30 individual hoses. However, there is a problem with carbon steel mandrels, as the metallic inner member of the hose is often made of stainless steel. When such hose is manufactured using a carbon steel mandrel, part of the carbon steel can be transferred to the surface of the stainless steel inner member; this causes a site for corrosion of the inner member, which can lead to rapid failure in extreme environments. For this reason, the mandrel used in the manufacture of bellows hose and composite hose usually has to be made of stainless steel. A stainless steel hose costs three to four times as much as a carbon steel mandrel.

SUMMARY

We have now found an improved way of manufacturing hose, which makes it possible to manufacture useful composite hose in lengths and diameters that have not previously been attainable. Thus, the invention encompasses a method of manufacturing hose, an apparatus for manufacturing hose, and hose per se.

According to one aspect of the invention, there is provided a hose comprising a tubular hose portion extending continuously between two end fittings, wherein said hose portion comprises a tubular body disposed between inner and outer gripping members, wherein the tubular body comprises at least one sealing layer and at least one reinforcing layer, and wherein the internal diameter of the hose portion is at least 200 mm and the length of the hose portion is at least 30 m.

It will be appreciated that the hose portion extends continuously between the end fittings. Thus, the hose according to the invention is distinct from prior art hose comprising shorter lengths of hose which are attached together in sequence by attaching the end fittings together.

In a preferred embodiment, the length of the hose portion is at least 31 m, more preferably at least 32 m. The hose portion is desirably at least 35 m in length. The length of the hose portion may be much longer than 30 m, depending on the requirements. Thus, the hose portion might have a length of up to 50 m or even up to 60 m. The length of the hose portion will typically lie within the ranges discussed above, subject to the minimum of at least 30 m.

The inner diameter of the hose portion is preferably at least 100 mm, or at least 150 mm, or at least 200 mm, or at least 250 mm, more preferably at least 300 mm, and still more preferably at least 350 mm and most preferably at least 400 mm. In accordance with preferred embodiments of the invention, the hose portion inner diameter may be at least 450 mm, at least 500 mm, at least 550 mm or at least 600 mm. It is unlikely to be desirable for the hose portion diameter to exceed 750 mm, and typically the hose portion diameter would not exceed 600 mm.

Most preferably the hose portion has a length of from 30 m or 35 m up to about 50 m, in combination with an inner diameter from 200 mm to 600 mm, preferably from 300 mm to 600 mm, most preferably 400 mm to 600 mm.

According to another aspect of the invention, there is provided a hose comprising a tubular hose portion extending continuously between two end fittings, wherein said hose portion comprises a tubular body disposed between inner and outer gripping members, wherein the tubular body comprises at least one sealing layer and at least one reinforcing layer, and wherein the internal diameter of the hose portion is at least 300 mm and the length of the hose portion is at least 5 m.

In a preferred embodiment, the length of the hose portion is at least 8 m, more preferably at least 10 m, more preferably at least 15 m, still more preferably at least 20 m, or at least 25 m. In particularly preferred embodiments, the hose portion may be at least 30 m in length. The length of the hose portion may be much longer than 30 m, depending on the requirements. Thus, the hose portion might have a length of up to 50 m or even up to 60 m.

The inner diameter of the hose portion is preferably at least preferably at least 350 mm and most preferably at least 400 mm. In accordance with preferred embodiments of the invention, the hose portion inner diameter may be at least 450 mm, at least 500 mm, at least 550 mm or at least 600 mm. It is unlikely to be desirable for the hose portion diameter to exceed 750 mm, and typically the hose portion diameter would not exceed 600 mm.

Most preferably the hose portion has a length of from 8 m or 10 m up to about 50 m, in combination with an inner diameter from 400 mm to 600 mm.

The inner diameter of the hose portion according to the invention corresponds to the outer diameter of the non-metallic mandrel on which it was formed. The length of the hose portion corresponds to the distance between the end fittings immediately after manufacture of the hose. It should also be noted, that owing to the nature of the materials and the manufacturing process, the hose dimensions would usually be subject to a tolerance of about +/−3%.

It is important to understand that the present invention provides a working composite hose having a length and/or diameter which is greater than that which has been possible in accordance with the prior art. There may be examples in the prior art of hose which has a diameter and/or length within the ranges described above, but such hoses are not working hoses, i.e., they would not be able to operate under their normal operating pressure without leaking.

The hose according to the invention may have a high or low working temperature, including a cryogenic working temperature.

For example, when the hose is intended for use at high temperatures, the working temperature of the hose may be at least 40° C., or at least 60° C., or at least 80° C. or at least 100° C., up to a maximum of 200° C. or 300° C.

When the hose is intended for use at low temperatures, the working temperature of the hose may be from 0° C. down to −200° C. or −220° C. Typically the working temperature is −20° C. or below, −40° C. or below, −60° C. or below, or −80° C. or below. For cryogenic applications, the working temperature will typically be from −10.0° C. to −170° C., −200° C. or −220° C. A working temperature range from −100° C. to −220° C. is suitable for most cryogenic applications, including the transportation of LNG, liquid oxygen (bp −183° C.) or liquid nitrogen (bp −196° C.).

In general, the working pressure of the hose is be in the range from about 500 kPa gauge, or 1,000 kPa gauge, up to about 2,000 kPa gauge, or possibly up to about 2,500 kPa gauge. These pressures relate to the operating pressure of the hose, not the burst pressure (which must be several times greater).

The working volumetric flow rate depends upon the fluid medium, the pressure and the inner diameter. Working flowrates from 1,000 m$^3$/h up to 12,000 m$^3$/h are typical.

A preferred working temperature and pressure would be from −100° C. to −200° C. at a pressure from 500 kPa gauge, preferably 1,000 kPa gauge, up to 2,000 kPa gauge or 2,500 kPa gauge.

The hose according to the invention can also be provided for use with corrosive materials, such as strong acids, According to another aspect of the invention there is provided the use of the hose described above in the working temperature, working pressure, and/or working flowrates described above to transport a liquid through the hose without any leakage of the liquid through the hose.

In the composite hose according to the invention the inner gripping member, is preferably a helical gripping member, and is most preferably a wire. Likewise, the outer gripping member, is preferably a helical gripping member, and is most preferably a wire. Typically the inner gripping member and/or the outer gripping member is a metal, preferably stainless steel.

The tubular body preferably comprises a sealing layer sandwiched between inner and outer reinforcing layers.

The hose portion advantageously also includes axial strengthening means which is adapted to exert a radially inward force on at least part of the tubular body when the axial strengthening means is subjected to axial tensioning. In a particularly advantageous embodiment the axial strengthening means is provided in the form of a generally tubular braid. In this specification the term "braid" refers to a material which is formed of two or more fibres or yarns which have been intertwined to form an elongated structure. It is a feature of braid that it can elongate when subjected to an axial tension. It is a further feature of braid that, when provided in a tubular form, its diameter will reduce when the braid is subjected to axial tension. Thus by providing a tubular braid around the tubular body, or within the structure of the tubular body, the braid will exert a radially inward force on at least part of the tubular body when subjected to axial tension. The braid is preferably in the form of a tubular sheath which is applied to the hose structure by pulling it over the components of the hose that have already been arranged on the mandrel.

The reinforcing layers and the sealing layer are preferably wrapped around the inner gripping member.

The hose may also include one or more additional reinforcing layers, along with one or more insulation layers, and one or more layers to improve the buoyancy of the hose. The hose may include one or more protective layers. Preferably there is at least one protective layer overlying the outer gripping member.

The most preferred composite hose for use in the present application is described in WO01/96772, WO 2004/044472 and WO 2004/079248, the contents of which are incorporated by reference. The structure of the hose may be substantially identical to the hose described in these publications, except that the present invention enables working hose to be produced which is longer and/or of greater diameter, owing to the improvements in the manufacturing process according to the invention. The end fittings for the hose may also be as described in the above three publications.

The hose described above can be manufactured by a method and apparatus, as described further below, which makes it possible to make hose of longer length and diameter than has previously been possible.

According to another aspect of the invention there is provided a method of manufacturing hose comprising a tubular hose portion extending continuously between two end fittings, wherein said hose portion comprises a tubular body disposed between inner and outer gripping members and the tubular body comprises at least two layers and includes at least one sealing layer and at least one reinforcing layer, wherein said method comprises winding the inner gripping member around a non-metallic mandrel, wrapping a first of the layers of the tubular body around the inner gripping member, wrapping a second of the layers of the tubular body around the first layer of the tubular body, winding the outer gripping member around the second reinforcing layer, applying a respective one of the end fittings to each end of the hose portion, and removing the hose from the mandrel.

The end fittings are preferably applied before removing the hose from the mandrel, although they may in some circumstances be applied after removing the hose from the mandrel. Preferably the mandrel is formed of a paper based material, a wood based material or a plastics polymer based material, such as high density polyethylene, or mixtures thereof. In one particularly advantageous embodiment, the mandrel is cardboard, i.e. a board made of paper pulp.

In the manufacture of composite hose, it is particularly important to ensure that the mandrel has sufficient radial stiffness to withstand the large crushing forces applied during the formation of the hose portion. Thus, it is advantageous that the mandrel has sufficient radial stiffness that the hose portions can be formed on the mandrel without causing any substantial change to the cross-sectional shape of the mandrel.

To achieve this, in one advantageous embodiment, the mandrel is formed of a material having a ratio of Young's Modulus (E) to density ($\rho$) in the range 0.1 to 10 GPa·m³/Mg (i.e. giga Pascal×meter³/megagram). Preferably the ratio of E/$\rho$ is greater than 0.3 GPa·m³/Mg, more preferably greater than 0.5 GPa·m³/Mg, and most preferably greater than 0.8 GPa·m³/Mg. Preferably the ratio of E/$\rho$ is less than 10 GPa·m³/Mg, more preferably less than 5 GPa·m³/Mg, and most preferably less than 3 GPa·m³/Mg. Thus, it will be appreciated that the most preferred range of E/$\rho$ is from 0.8 to 3 GPa·m³/Mg.

The values of E/$\rho$ for cardboard and high density polyethylene, which are two materials particularly preferred for the mandrel, are about 1.2 and 1.0 GPa·m³/Mg respectively. The value of E/$\rho$ for the prior art mandrel material, stainless steel, is about 20 GPa·m³/Mg.

In some circumstances, it may be desirable to use composite materials, i.e., fibres disposed within a matrix, as the mandrel. Composite materials have a ratio of E/$\rho$ close to stainless steel, but the density is much lower. Thus, in an alternative embodiment, the material of the mandrel has an E/$\rho$ in the range 20 to 22 GPa·m³/Mg and a density in the range 1.0 to 3.0 Mg/m³. Typically, the composite material comprises carbon, glass or polymeric fibres disposed within a suitable polymeric matrix.

It will, of course be appreciated that, while the mandrel is made of a non-metallic material, it is perfectly possible for the mandrel to include metallic or ceramic fillers. Thus the invention encompasses the use of a cardboard mandrel with a metallic or ceramic filler. The bulk of the mandrel, however, remains non-metallic.

The mandrel may be provided in one continuous length, or it may be provided in a plurality of mandrel sections of shorter length, which are assembled on site to form the completed mandrel. The purpose of this is to facilitate transport of the mandrel.

Typically the mandrel is of substantially cylindrical shape.

The length of the mandrel will typically be approximately 1000 to 2000 mm longer than the length of the hose portion that it is desired to make on the mandrel. The outer diameter of the mandrel will typically be substantially identical to the inner diameter of the hose portion that it is desired to make on the mandrel. Thus, the mandrel will typically have an outer diameter of 200 mm, or 300 mm to 600 mm.

Advantageously, the mandrel is hollow, so that a drive shaft may be disposed longitudinally within the mandrel. In addition, a plug is preferably disposed in at least one end of the mandrel, the arrangement being such that the plug is fixedly secured to the mandrel, whereby rotation of the plug causes rotation of the mandrel. Preferably one of said plugs is disposed in each end of the mandrel. When the mandrel is hollow, the thickness of the mandrel (i.e. the difference between its inner and outer diameter) would typically be about 10 mm to 25 mm.

As discussed above, the non-metallic mandrel should be made of a material which is strong enough that the mandrel can properly support the hose during construction thereof. Furthermore, except for any coating that may be provided on the inner or outer surface of the mandrel, the entire mandrel is preferably made of the same non-metallic material.

The drive shaft is preferably secured to the or each plug, and desirably has a projecting end which can be connected to a drive motor, whereby rotation of the drive shaft causes rotation of the or each plug and thereby rotation of the mandrel. It is a preferred feature of the invention that the mandrel is rotated while part or all of the inner and/or outer structures are arranged in place on the mandrel. Preferably the drive motor is provided with a gearbox.

In an alternative, the drive shaft may not be present, and the rotation of the mandrel may be driven by rotating one plug or both plugs (if present) using the drive motor.

In one preferred embodiment, the mandrel is a sacrificial mandrel, in order to aid removal of the hose from the mandrel. In this embodiment, the hose is removed from the mandrel by sacrificing the mandrel, and removing it from within the hose; any plugs and drive shaft can be removed before sacrificing the mandrel. The mandrel may be sacrificed by, for example, providing it with a pre-weakened area, which can be stressed in order to cause sacrifice of the mandrel; or providing it with a perforation, along which the mandrel can be torn apart; or providing it with a zipper structure, whereby dragging the zipper along the length of the mandrel causes sacrifice of the mandrel. The precise means used to make the mandrel a sacrificial mandrel is conventional, and other conventional techniques not described above could be used instead. It will be noted that sacrifice of the mandrel causes it to be destroyed, which means that it cannot be reused. This is still very economical, as the mandrel according to the invention can be made of an inexpensive recyclable material.

Another technique for removing the mandrel, when the mandrel is made from a material which can be weakened by contact with an appropriately selected fluid, is to wet the mandrel in order to weaken it with the fluid, then to remove the weakened mandrel. One way to wet mandrel is to dip the entire hose and mandrel structure in a tank of the fluid. It is preferred that the fluid is water, but other fluids, such as weak acetic acid or an alcoholic solution may instead be used.

In another preferred embodiment, the mandrel is removed by unscrewing it from the hose. The can desirably be achieved by applying a torque to the drive shaft, while holding the hose against rotation. This technique is particularly suitable when the hose inner structure includes a helical member, as the helical member can create a slight indentation in the mandrel, which aids unscrewing the mandrel from the hose.

In an embodiment the mandrel may be pre-coated, prior to assembly of the hose, in order to assist with removal of the completed hose from the mandrel. The pre-coat may serve to reduce the friction between the mandrel and the completed hose.

According to another aspect of the invention there is provided apparatus for manufacturing hose of the type comprising a tubular hose portion extending continuously between two end fittings, wherein said hose portion comprises a tubular body disposed between inner and outer gripping members and the tubular body comprises at least two layers and includes at least one sealing layer and at least one reinforcing layer, wherein said apparatus comprises a hollow substantially cylindrical non-metallic mandrel, around which the hose may be arranged, a plug disposed at each end of the mandrel, the plugs being fixed to the mandrel, whereby torque applied to the plugs is transmitted to the mandrel to rotate the mandrel about its longitudinal axis, and a drive shaft extending longitudinally along the interior of the mandrel, the drive shaft being connected to the plugs, whereby torque applied to the drive shaft is transmitted to the plugs to rotate the plugs, the drive shaft projecting outwardly from the plugs and mandrel at least one end of the mandrel.

The mandrel preferably has the same construction as the mandrel described above in relation to the method according to the invention.

Preferably, the drive shaft projects outwardly from the plugs and mandrel at each end of the mandrel.

In a preferred embodiment, the apparatus further comprises a drive motor arranged to rotate the drive shaft.

In the prior art, the manufacture of composite hose is exclusive carried out using carbon steel or, more usually, stainless steel mandrels, and it has not been contemplated that any other materials would be suitable. We have unexpectedly found that other materials are suitable, and that they have many advantages over the prior art. Thus, in 2005, a suitable cardboard mandrel can be obtained at a cost of around £150, compared with at least. £25,000 for a carbon steel mandrel, and at least £75,000 for a stainless steel mandrel. Although the mandrel according to the invention would not normally be used more than once, there is still a considerable saving.

Furthermore, the non-metallic mandrels according to the invention can be removed from the completed hose much more easily than the prior art steel mandrels.

The non-metallic mandrels according to the invention are much lighter than the steel mandrels used in the prior art. This means that they are easier to manipulate and transport. It also means that the non-metallic mandrels do not require the same level of support that is required for steel mandrels. This eases the manufacturing process for the hose.

One particularly important advantage of the mandrel according to the invention is that it is practical to make them longer and/or of greater diameter than the prior art steel mandrels. Thus, as described above, it has not been previously possible to make to make a working composite hose at lengths above approximately 25 m to 30 m, or at diameters above about 200 mm to 300 mm. A working hose is one which can be used in its normal operating conditions without leaking.

Thus, it has not previously been possible to make working composite hose, having any significant diameter, in lengths greater than 25 m to 30 m.

BRIEF DESCRIPTION OF THE DRAWINGS

Reference is now made to the accompanying drawings, in which.

DETAILED DESCRIPTION

Figure 1:
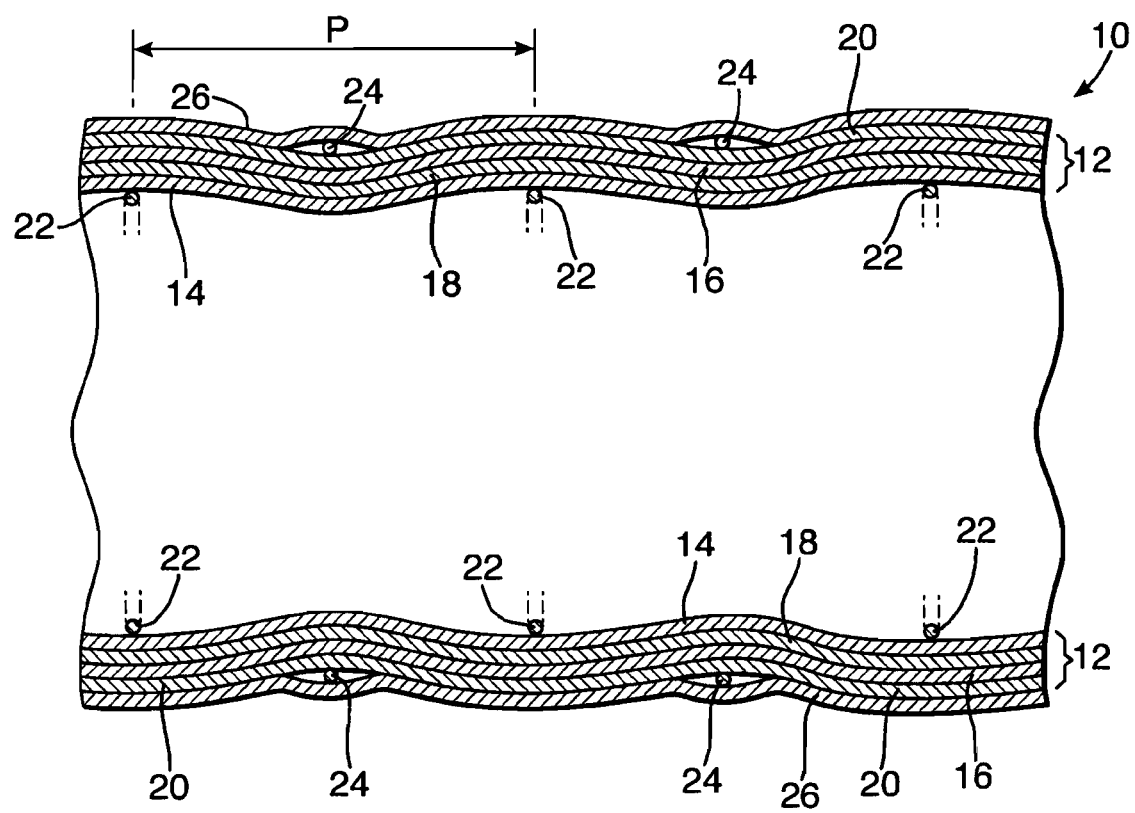
FIG. 1 is a schematic cross-sectional view of a composite hose according to the invention.

In FIG. 1 a composite hose in accordance with the invention is generally designated 10. In order to improve the clarity the winding of the various layers in FIG. 1 has not been shown.

The hose 10 comprises a tubular body 12 which comprises an inner reinforcing layer 14, an outer reinforcing layer 16, and a sealing layer 18 sandwiched between the layers 14 and 16. A generally tubular sheath 20, which provides axial strengthening, is disposed around the outer surface of the outer reinforcing layer 16.

The tubular body 12 and the tubular sheath 20 are disposed between an inner helically coiled wire 22 and an outer helically coiled wire 24. The inner and outer wires 22 and 24 are disposed so that they are offset from one another by a distance corresponding to half the pitch length of the helix of the coils.

An insulation layer 26 is disposed around the outer wire 24. The insulation layer may be a conventional insulating material, such as a plastics foam, or may be a material described in relation to FIG. 7 in WO01/96772.

The reinforcing layers 14 and 16 comprise woven fabrics of a synthetic material, such as UHMWPE or aramid fibres. The structure of suitable reinforcing layers is described in more detail in FIG. 3 of WO01/96772.

The sealing layer 18 comprises a plurality of layers of plastics film which are wrapped around the outer surface of the inner reinforcing layer 14 to provide a fluid tight seal between the inner and outer reinforcing layers 14 and 16.

The hose 10 may include a further reinforcing layer (not shown) disposed between the sheath 20 and the outer wires 24. The further reinforcing layer may have similar characteristics to the sheath 20 and the tubular body 12.

The tubular sheath 20 is formed of two sets of fibres 20a and 20b which are braided to form a tubular braid. This is shown in FIGS. 4A and 4B of WO01/96772.

The sealing layer 18 is shown in greater detail in FIG. 6 of WO01/96772. The sealing layer 18 comprises a plurality of layers of a film made of a first polymer (such as a highly oriented UHMWPE) interleaved with a plurality of layers of a film made of a second polymer (such as PFTE or FEP), the two polymers having a different stiffness. The layers are wrapped around the outer surface of the inner reinforcing layer 14 to provide a fluid tight seal between the inner and outer reinforcing layers 14 and 16. It will be appreciated that, if desired, the sealing layer 18 may be made of a single type of polymer, i.e., it does not have to include two or more different types of polymer.

The ends of the hose 10 may be sealed using the end fitting 200 shown in FIG. 8 of WO01/96772 and/or as described in WO 2004/079248. The end fittings are illustrated schematically in FIG. 1 and are designated with reference numeral 28.

Figure 2A:
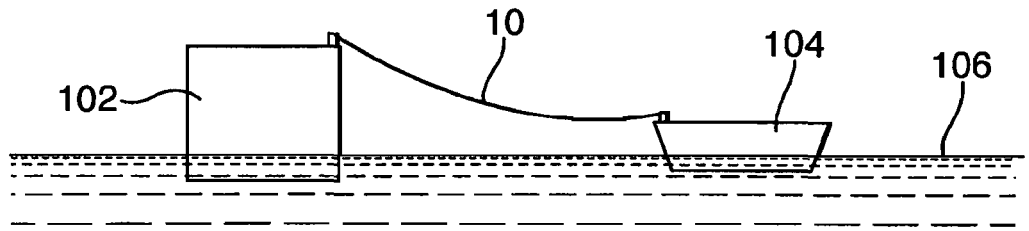
FIGS. 2A, 2B, 2C and 2D show four applications of hose according to the present invention.
Figure 2B:
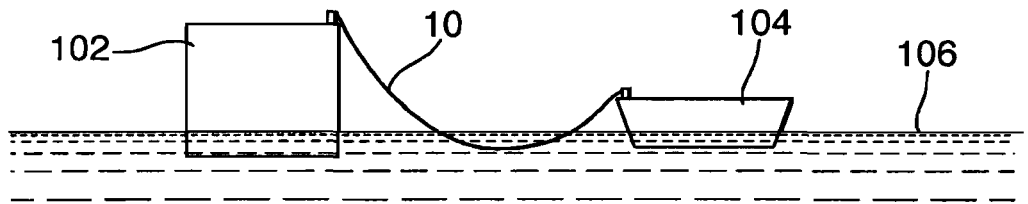
Figure 2C:
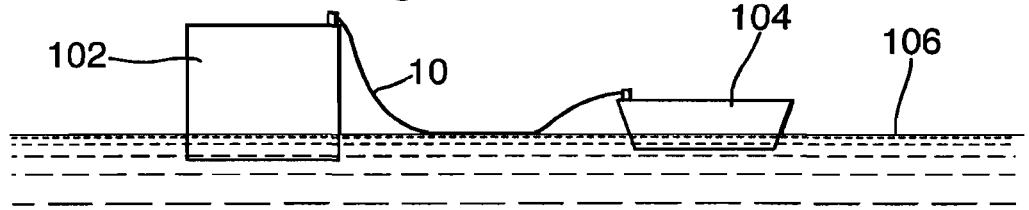
Figure 2D:
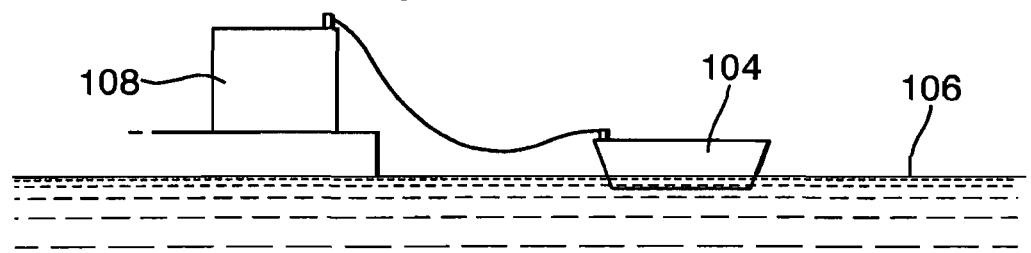

FIGS. 2A to 2D show three applications for the hose 10. In each of FIGS. 2A to 2C a floating production, storage and offloading vessel (FPSO) 102 is linked to a LNG carrier 104 by means of a hose 10 according to the invention. The hose 10 carries LNG from a storage tank of the FPSO 102 to a storage tank of the LNG carrier 104. In FIG. 2A, the hose 10 lies above the sea level 106. In FIG. 2B, the hose 10 is submerged below the sea level 106. In FIG. 2C, the hose 10 floats near the surface of the sea. In each case the hose 10 carries the LNG without any intermediate support. In FIG. 2D the LNG carrier is linked to a land-based storage facility 108 via the hose 10.

The hose 10 may be used for many other applications apart from the applications shown in FIGS. 2A to 2D. The hose may be used in cryogenic and non-cryogenic conditions.

Figure 3:
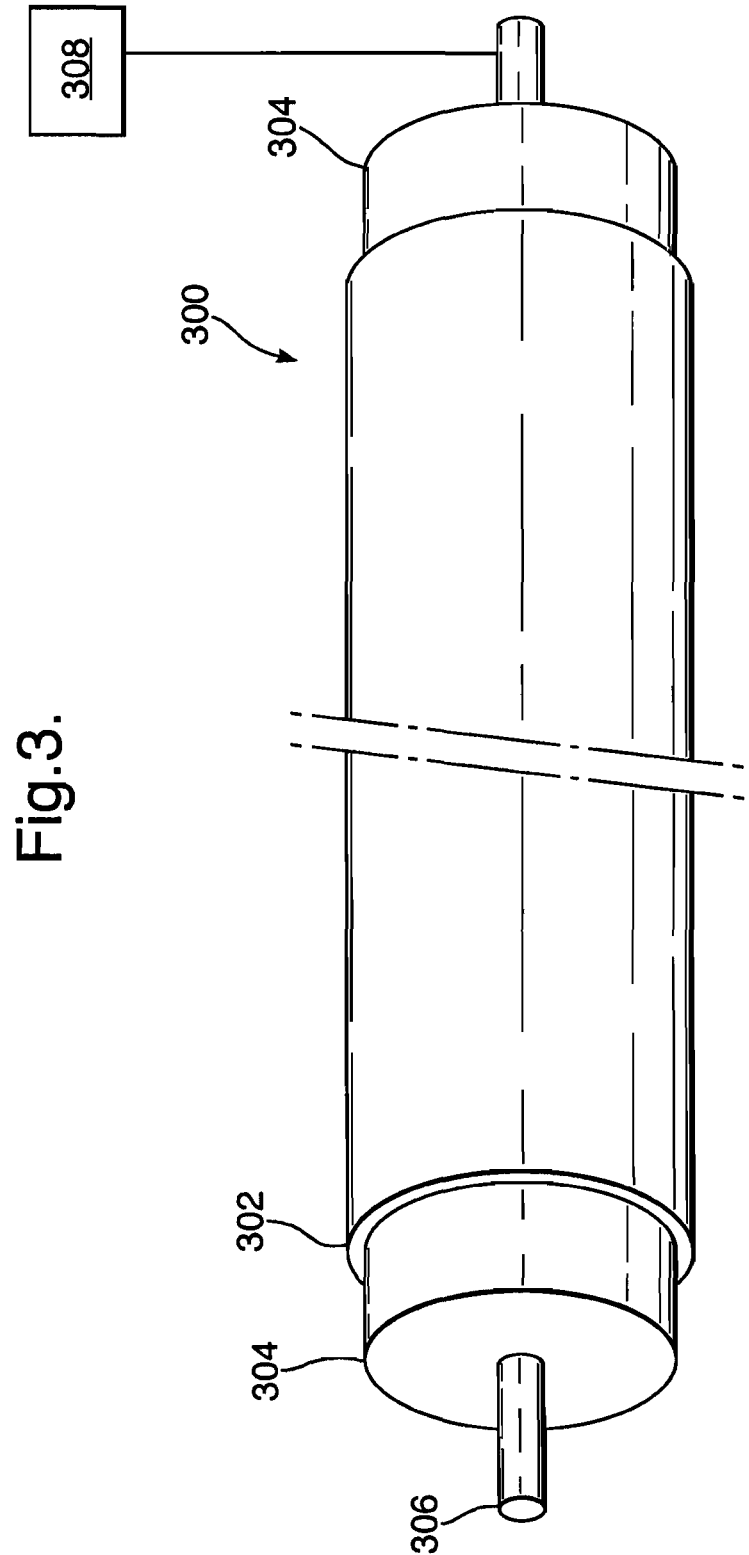
FIG. 3 is a perspective view of an apparatus for use in manufacturing hose, according to the invention.
Figure 4:
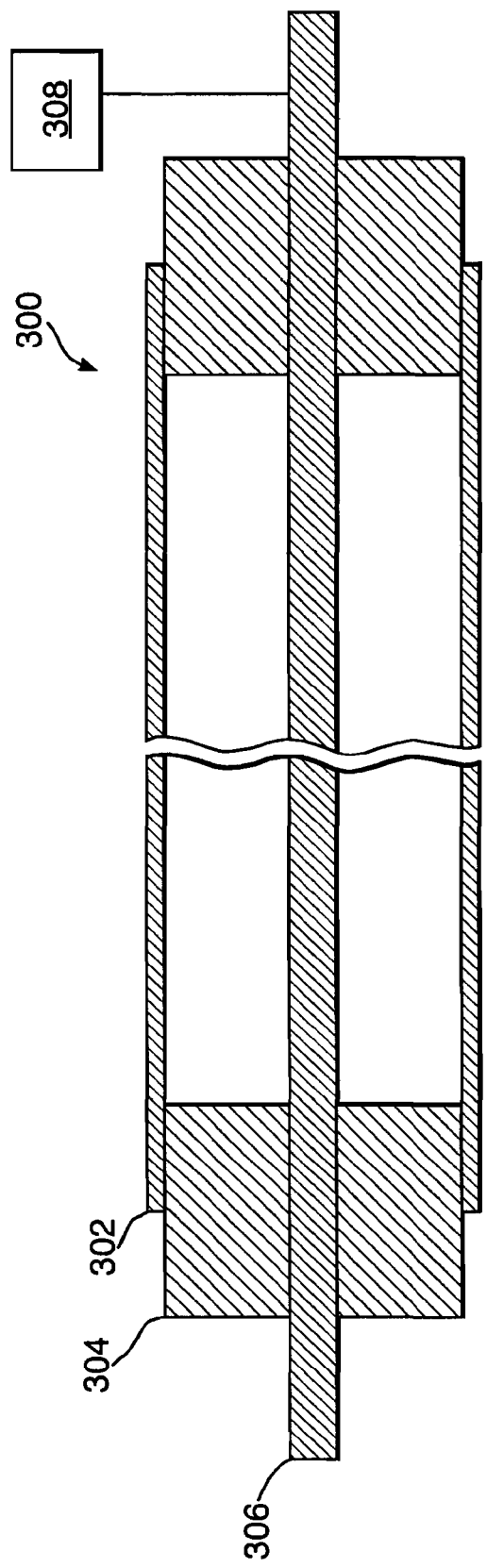
FIG. 4 is a cross-sectional view of the apparatus shown in FIG. 3.

FIGS. 3 and 4 show apparatus 300 according to the invention. The apparatus 300 can be used in the method according to the invention for making the hose according to the invention.

The apparatus 300 comprises a mandrel 302 which has a length and diameter corresponding to the desired length and diameter of the hose 10 and 200. The outer diameter of the mandrel 302 corresponds to the inner diameter of the hose 10 or 200. The length of the mandrel 302 is typically about 1-2 m longer than the length of the hose 10 or 200. The mandrel 300 has a substantially circular cross sectional shape, although other shapes may in some circumstances be desirable.

A torque transmitting plug 304 is secured to each end of the mandrel 300, and a drive shaft 306 extends along the length of the mandrel between the plugs 304, and extends outwardly being the ends of the mandrel 302. A drive motor 308, which may be an electric motor, is provided to drive rotation of the drive shaft 306. It will be appreciated that the drive shaft 306 can transmit torque to the plugs 304, which in turn can transmit torque to the mandrel 302 to rotate the mandrel 302. Typically the mandrel will be rotated at a rate of 10-60 rpm.

The application of the hose 10 to the mandrel 300 causes large radial forces to be directed against the mandrel. For example, the inner wire 22 is typically a non-flexible rigid steel material which has to be wound around the mandrel using a machine. Thus, it is important that the mandrel 300 has sufficient radial stiffness that the hose portion can be formed on the mandrel without causing any substantial change to the cross-sectional shape of the mandrel. This is important, because if the mandrel deforms inwardly, the hose will be deformed, and will be more likely to fail during use. One way to select a mandrel of the appropriate radial stiffness is to select a material having an appropriate ratio of Young's Modulus (E) to density ($\rho$), as described above, but other techniques may be apparent to the skilled person.

The manufacture of hose using the apparatus 300 will now be described with reference to the composite hose 10. Initially, the apparatus 300 is set in place, and the drive motor 308 is operated to rotate the mandrel 302 at the required rate. As a first step, the inner wire 22 is wound around the mandrel 302, in order to provide a helical arrangement having a desired pitch. As noted above, the outer diameter of the mandrel 302 corresponds to the desired internal diameter of the hose 10. The inner reinforcing layer 14 is then wrapped around the inner wire 22 and the support mandrel, such that warp direction W is set at the desired angle, $\alpha$.

A plurality of layers of the plastics films 18a, 18b making up the sealing layer 18 are then wrapped around the outer surface of the inner reinforcing layer 14. Usually, the films 18 would have a length substantially less than the length of the hose 10, so that a plurality of separate lengths of the films 18 would have to be wound around the inner layer 14.

The outer reinforcing layer 16 is then wrapped around the sealing layer 18, such that the warp direction W is set at the desired angle (which may be $\alpha$, or may be some other angle close to $\alpha$). The tubular axial strengthening sheath 20 is drawn over the outside of the outer reinforcing layer 16. If desired, the further reinforcing layer 21 is then pulled over the sheath 20.

The outer wire 24 is then wrapped around the further reinforcing layer 21, in order to provide a helical arrangement having a desired pitch. The pitch of the outer wire 24 would normally be the same as the pitch of the inner wire 22, and the position of the wire 24 would normally be such that the coils of the wire 24 are offset from the coils of the wire 22 by a distance corresponding to half a pitch length; this is illustrated in FIG. 1, where the pitch length is designated p.

A polyurethane resin may then be sprayed over the outer surface of the sheath 20 to form a resin coating over the sheath 20 and the outer wire 24. The resin may then be left to harden, in order to form the layer 26a. In addition, or instead, a profiled wrap as described in WO 2004/044472 may be provided around the outer surface of the sheath 20.

It will be appreciated that, during the wrapping steps described above, the mandrel 302 is rotating, so each layer simply needs to be laid onto the mandrel 302 in the desired place, at the desired angle to the longitudinal axis of the mandrel 302. Any layers which comprise a sheath (such as the layer 20 and the further reinforcing layer) are drawn onto the mandrel and the underlying hose, and are pulled longitudinally to the correct position; rotation of the mandrel 302 may be interrupted while any sheath layers are applied.

The ends of the hose 10 may be sealed by crimping a sleeve onto an insert inside the hose 10. This termination is generally applied after the hose 10 has been removed from the mandrel.

The ends of the hose 10 are sealed using the end fittings 28. When the end fittings 28 are in place, the hose 10 may be removed from the mandrel 302 by any desired means. In one embodiment, the mandrel 302 may simply be destroyed, for example by tearing. In another embodiment, the drive motor 308 is operated to drive the mandrel 302 in the opposite direction to the direction when the hose 10 was applied. This causes the mandrel 302 to unscrew from the hose 10.

After the hose 10 has been removed from the mandrel 302, the mandrel 302 may be discarded. The plugs 304, the drive shaft 306 and the drive motor 308 may be retained for use with another mandrel 302.

It will be appreciated that the invention described above may be modified within the scope of the claims.

The invention claimed is:

1. A method of manufacturing a composite cryogenic hose that comprises a tubular hose portion having an inner diameter of at least 200 mm, a length greater than 25 m, and extending continuously between two end fittings, wherein the hose portion comprises a tubular body disposed between inner and outer gripping members and the tubular body comprises at least two layers and includes at least one sealing layer and at least one reinforcing layer, wherein the method comprises:
   a. winding the inner gripping member around a non-metallic hollow mandrel while the mandrel is being rotated by a drive motor operatively connected with the mandrel wherein
      i. the mandrel is formed from a material selected from the group consisting of (I) a material having a ratio of Young's Modulus (E) to density ($\rho$) E/$\rho$ in the range 0.1 to 10 GPa·m$^3$/Mg and (II) a material having a ratio of Young's Modulus (E) to density ($\rho$) E/$\rho$ in the range 20 to 22 GPa·m$^3$/Mg and a density in the range 1.0 to 3.0 Mg/m, and
      ii. the mandrel has an outer diameter of at least 200 mm
   b. wrapping a first of the layers of the tubular body around the inner gripping member,
   c. wrapping a second of the layers of the tubular body around the first layer of the tubular body,
   d. winding the outer gripping member around the second reinforcing layer,
   e. applying a respective one of the end fittings to each end of the hose portion, and
   f. removing the hose from the mandrel.

2. A method according to claim 1, wherein the mandrel is formed of a paper based material, a wood based material or a plastics polymer based material, or mixtures thereof.

3. A method according to claim 1, wherein the mandrel is cardboard.

4. A method according to claim 1, wherein the mandrel is formed of a material having from 0.8 to 3 GPa·m$^3$/Mg.

5. A method according to claim 1, wherein the mandrel is of substantially cylindrical shape.

6. A method according to claim 1, further including a drive shaft disposed longitudinally within the mandrel.

7. A method according to claim 1, wherein a plug is disposed in at least one end of the mandrel, such that the plug is fixedly secured to the mandrel, whereby rotation of the plug causes rotation of the mandrel.

8. A method according to claim 1, wherein the mandrel is a sacrificial mandrel, in order to aid removal of the hose from the mandrel.

9. A method according to claim 1, wherein the mandrel is pre-coated, prior to assembly of the hose, in order to assist with removal of the completed hose from the mandrel.

\* \* \* \* \*